United States Patent [19]

Rappas et al.

[11] 4,128,416

[45] Dec. 5, 1978

[54] NICKEL RECOVERY EMPLOYING CARBONYL FERRATES

[75] Inventors: Alkis S. Rappas, Bedford; J. Paul Pemsler, Lexington, both of Mass.

[73] Assignee: Kennecott Copper Corporation, New York, N.Y.

[21] Appl. No.: 868,054

[22] Filed: Jan. 9, 1978

[51] Int. Cl.$^2$ ............................................. C22B 23/04
[52] U.S. Cl. .......................................... 75/119; 75/82; 75/108; 423/129
[58] Field of Search ................... 75/119, 82, 121, 108; 423/129

[56] References Cited

U.S. PATENT DOCUMENTS

| | | | |
|---|---|---|---|
| 3,658,475 | 4/1972 | O'Neill | 75/119 X |
| 3,688,474 | 9/1972 | Head et al. | 75/82 X |
| 3,775,099 | 11/1973 | Coffield et al. | 75/119 |
| 3,804,614 | 4/1974 | Coffield et al. | 75/103 |
| 3,967,958 | 7/1976 | Coffield et al. | 75/119 X |

Primary Examiner—G. Ozaki
Attorney, Agent, or Firm—John L. Sniado; Anthony M. Lorusso

[57] ABSTRACT

A novel process for recovering nickel metal from aqueous ammoniacal nickel solutions such as leach liquors at or close to ambient temperatures and pressures. The process comprises contacting the nickel solution with carbonyl ferrate ions such as $HFe(CO)_4^-$ or $Fe(CO)_4^{--}$ in the presence of carbon monoxide to produce nickel carbonyl. The nickel carbonyl is collected as a gas, concentrated, and decomposed to produce nickel metal and carbon monoxide. The carbonyl ferrate ions may conveniently be produced by subjecting an iron pentacarbonyl solution to an aqueous alkaline solution containing potassium hydroxide or the like. The nickel depleted ammoniacal liquor is purged of iron resulting from the nickel carbonylation treatment by oxidizing the ferrous values to iron oxide and may thereafter be recycled to solubilize additional nickel values. The iron oxide in turn may be reduced to iron pentacarbonyl and treated with an aqueous alkaline solution for reuse in carbonylation of additional nickel values.

12 Claims, 2 Drawing Figures

NICKEL RECOVERY EMPLOYING CARBONYL FERRATES

BACKGROUND OF THE INVENTION

This invention relates to a process for recovering nickel from aqueous solutions employing nickel tetracarbonyl as an intermediate. More particularly, it relates to a nickel carbonylation reaction which may be conducted at or close to ambient temperatures and pressures.

It is known that nickel can be recovered from its concentrated acidic solutions by electrowinning. However, if the nickel solution is ammoniacal, or if the solution is too dilute, the nickel ions must be extracted by liquid ion exchange and back extracted into a sulfuric acid solution before being electrowon. The purity of the nickel obtained from such a process is very sensitive to the nature and concentration of the impurities present in the solution.

It is also known that nickel can be obtained from solutions by hydrogen reduction at elevated temperatures and pressures. Typically, nickel won by this method is very impure.

Because of the difficulties of the foregoing nickel recovery processes, carbonylation processes for recovering nickel have recently been developed. In the carbonylation process, very pure nickel is obtained by converting nickel values to carbonyl compounds. The gaseous compound $Ni(CO)_4$ is then isolated and thermally decomposed to yield pure metal pellets and carbon monoxide gas. The purity of the nickel metal produced by this process is excellent because of the selectivity of the carbonylation reaction and the fact that other metals often present with nickel are either easily separated or do not form gaseous compounds.

There are many known methods for producing nickel tetracarbonyl from metallic nickel as well as from thermally unstable or reducable nickel compounds such as oxides, formates, acetates, or oxalates. However, the presently known method of carbonylating nickel in aqueous media require extreme conditions, that is, strongly alkaline solutions, high temperatures and pressures, and certain catalysts. For example, in U.S. Pat. No. 3,804,614 to Coffield et al., nickel is produced from ammoniacal slurries of nickel sulfide by reaction with carbon monoxide in the presence of cyanide ion. U.S. Pat. No. 3,775,099 to Coffield et al., in addition to cyanide, discloses that sulfide, cysteine, and tartrate ligands promote nickel carbonylation. U.S. Pat. No. 3,658,475 to O'Neil et al., discloses another carbonylation procedure. However, in practical application, all of the foregoing methods require temperatures above 100° C. and carbon monoxide pressures on the order of 30 or more atmospheres. Thus, in order to produce nickel tetracarbonyl, the carbonylation reaction must be carried out in expensive autoclaves.

SUMMARY OF THE INVENTION

The instant invention is based on the discovery that certain carbonyl ferrate ions, in a reducing environment of carbon monoxide, can react directly with nickel ammine to produce the gaseous compound $Ni(CO)_4$. Most importantly, this reaction has been observed to take place rapidly and with good yields at or close to ambient temperatures and pressures. As used throughout this specification and claims, the phrase "at or close to ambient temperature and pressure" refers to a temperature generally in the range between about 25° and 100° C. and a pressure less than about 3 atmospheres. While these favorable reaction conditions comprise a most significant advantage of the process of the invention, it should be noted that this carbonylation reaction can take place at higher pressures. Of course, when practiced as preferred at the relatively low temperatures and pressures, the process of the invention is characterized by significantly reduced capital cost, since pressurized vessels such as autoclaves need not be employed.

The carbonyl ferrate ions responsible for the carbonylation may readily be generated by subjecting iron pentacarbonyl to aqueous alkaline solutions containing potassium, sodium, calcium, or barium hydroxide. This treatment results in the production of active carbonyl ferrate ions in accordance with reactions such as:

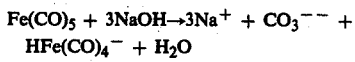

$Fe(CO)_5 + 3NaOH \rightarrow 3Na^+ + CO_3^{--} + HFe(CO)_4^- + H_2O$

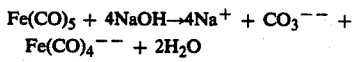

$Fe(CO)_5 + 4NaOH \rightarrow 4Na^+ + CO_3^{--} + Fe(CO)_4^{--} + 2H_2O$

The active carbonyl ferrates are oxidized as nickel is reduced and may also undergo autooxidation to iron octocarbonyl. The presence of carbon monoxide is necessary to stabilize the resulting nickel carbonyl by pushing the following reaction to the right.

$4CO + Ni \rightleftharpoons Ni(CO)_4$

Also, the carbon monoxide rich environment may be a factor in regenerating the active ferrates by reducing iron octocarbonyl. A possible reaction is:

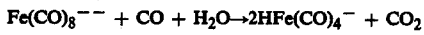

$Fe(CO)_8^{--} + CO + H_2O \rightarrow 2HFe(CO)_4^- + CO_2$

The sodium, potassium, barium, or calcium salts of these ferrates are soluble in water and in certain relatively polar water immiscible organic solvents. Accordingly, the carbonylation can be conducted in an aqueous system or a two-phase system wherein aqueous and organic phases are intimately admixed. The latter two-phase system has advantages in that the spent or "partially oxidized" ferrates remain in the organic phase. Accordingly, after separation of the phases, it is possible to regenerate the carbonylation aid by treatment with carbon monoxide and an aqueous alkaline solution. If the single phase hydrometallurgical system is employed, the spent ferrates may be extracted with a suitable organic solvent and regenerated or may be separated from the aqueous phase as a precipitate and regenerated.

In order to recycle the nickel depleted leach liquor, its iron content which increases as a result of the carbonylation process may be lowered to suitable levels by subjecting the solution to an oxidizing agent such as air. This precipitates the iron as iron oxide or hydroxide.

Accordingly, it is an object of the invention to provide a process for carbonylating ammoniacal nickel solutions at or close to ambient temperatures and pressures, thereby obviating the need to employ autoclaves and reducing capital costs.

Another object of the invention is to recover nickel from pregnant liquors obtained from leaching laterite ores or manganese nodules.

Still another object of the invention is to provide a rapid, high yield carbonylation technique operable to produce nickel carbonyl even from dilute ammoniacal nickel solutions.

Yet another object of the invention is to provide an overall nickel recovery system in which carbon monoxide is essentially the only consumed reagent.

DESCRIPTION OF THE PREFERRED EMBODIMENT

Figure 1:
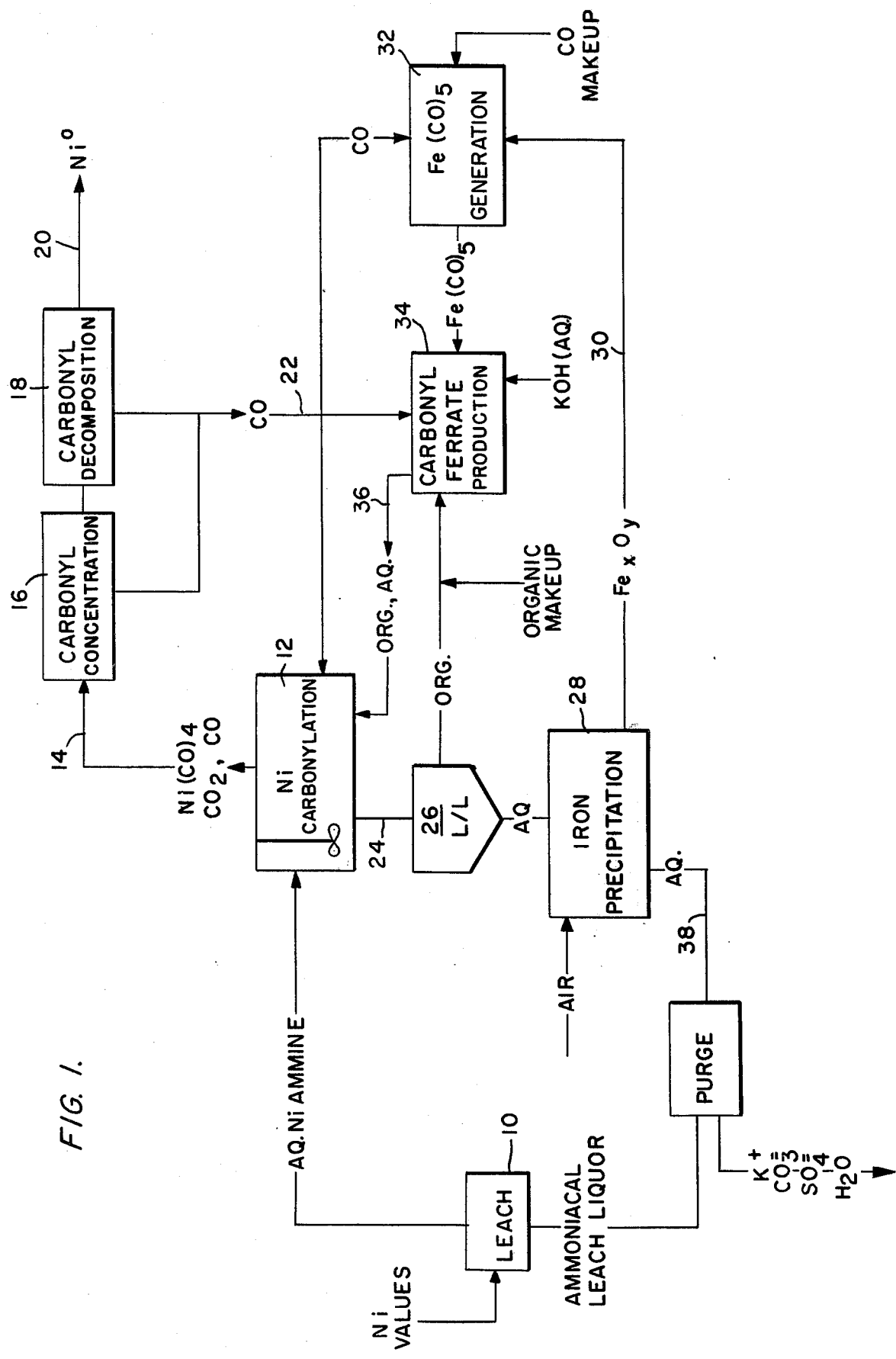
FIG. 1 is a schematic diagram illustrating a nickel recovery process embodying the carbonylation technique of the invention wherein an organic solvent is used as a carrier for the carbonyl ferrate ions.

A serious drawback of the known nickel recovery systems which employ nickel carbonyl as an intermediate is the high cost of the equipment necessary to conduct the carbonylation. Specifically, to obtain adequate yields and reaction rates suitable for an industrial process, conditions of high partial pressure of carbon monoxide and temperatures in excess of 100° C. are required. Under these conditions, industrial sized autoclaves or the like are required.

To overcome this difficulty, a single reagent was sought which (1) could act as a reducing agent, (2) contained carbon monoxide in its molecular structure which could be "transferred" to nickel ions or atoms, (3) had an affinity for nickel ions so that a suitable path for carbonylation could be provided, (4) could be regenerated with carbon monoxide in a separate phase, (5) was relatively inexpensive, and (6) did not introduce additional impurities into the nickel solution. In accordance with the invention, it has been discovered that carbonyl ferrate ions have all the foregoing properties. Thus, it has been discovered that, in a carbon monoxide atmosphere, $HFe(CO)_4^-$ and $Fe(CO)_4^{--}$ ions can reduce nickel and transfer carbon monoxide thereto to result in nickel carbonyl. Furthermore, such ions may be readily generated by contacting the well-known and relatively inexpensive reagent iron pentacarbonyl with aqueous basic solutions containing, for example, sodium, potassium, barium, or calcium hydroxide. In the presence of carbon monoxide, it is also possible to regenerate iron pentacarbonyl from the spent ferrates. These may be subsequently treated with an aqueous alkaline solution to regenerate the active carbonylation aid.

The carbonylation of ammoniacal nickel solutions with these ions may be effected by two basic methods which will hereinafter be referred to as the "single phase" and the "two-phase" methods. In the single phase method, a solution of iron pentacarbonyl is mixed with an aqueous alkaline solution, preferably a solution saturated with KOH, NaOH, $Ca(OH)_2$, or $Ba(OH)_2$. To promote stability of the carbonyl ferrates which result, the reaction should be conducted in a carbon monoxide rich environment. The active carbonyl ferrate ions are produced in accordance with reaction such as those set forth below:

$$Fe(CO)_5 + 3NaOH$$

$$Fe(CO)_5 + 4NaOH$$

$$3Na^+ + CO_3^{--} + HFe(CO)_4^- + H_2O$$

$$4Na^+ + CO_3^{--} + Fe(CO)_4^{--} + 2H_2O$$

The resulting aqueous solution is then contacted directly with an ammoniacal solution of nickel ions. The reaction is rapid, characterized by high yields, and advantageously, occurs with favorable kinetics at temperatures well below 100° C. and at carbon monoxide pressures which need only be high enough to provide a flow of carbon monoxide through the solution, i.e., 1–3 atmospheres. Nickel carbonyl is swept from the reacting solution together with small amounts of iron carbonyl. To collect the nickel carbonyl, it is preferred that the temperature of the solution be maintained above the boiling point of $Ni(CO)_4$ (42.1° C. at 1 atm). However, above about 100° C., iron pentacarbonyl is present in the off gas in increasing quantities. Accordingly, a low iron content nickel carbonyl product is obtained at temperature within the range of about 25°–85° C.

In the two-phase method, the active ferrate ions are generated by reacting iron pentacarbonyl with one or more of the basic solutions set forth above under an inert or carbon monoxide atmosphere and in the presence of a water insoluble alcohol. The presence of alcohol has been observed to accelerate the reaction. In this embodiment of the invention, the carbonyl ferrates produced are absorbed into the relatively polar water insoluble alcohol. Thereafter, the organic phase is separated from the aqueous and added to the aqueous ammoniacal nickel solution with vigorous stirring to promote contact between the phases. Again, nickel carbonyl is produced at temperatures above about 40° C. and low carbon monoxide pressures. If desired, to promote solubility of the carbonyl ferrates, a second water immiscible polar organic compound may be included with the water insoluble alcohol. Particularly suitable compounds in this regard are long chained amines such as those produced by Rohm and Haas Company, under the trademark "Primene".

The two-phase method is advantageous in that a substantial portion of the spent carbonyl ferrates remain in the organic phase. Accordingly, a vehicle is provided to facilitate regeneration. Thus, after carbonylation and separation of the phases, the carbonylation agent may be regenerated by treatment with carbon monoxide and exposure to an aqueous alkaline solution.

In both of the foregoing variations of the process of the invention, the substantially nickel-free ammoniacal liquor which remain after completion of the carbonylation reaction may readily be freed of iron by conventional techniques, purged, and recycled to leach additional nickel values. One preferred method of removing iron from the liquors is to sparge air into the aqueous phase, thereby precipitating the ferrous values as iron oxides or hydroxides.

Of course, it is well known that iron carbonyl can be readily produced from iron oxide and hydroxide if treated with carbon monoxide at high temperatures and pressures. This reaction requires the use of an autoclave, but is facilitated by the fine particle size of the iron compounds. Furthermore, because a solid is being treated, the size of the autoclave and therefore its cost is relatively small.

Another method of collecting the spent ferrates for recycle in the single phase system is to extract the ferrates into a suitable organic solvent such as a water immiscible alcohol. This approach has the dual advantages of reducing the iron content of the substantially nickel-free aqueous phase prior to leaching and providing a vehicle by which the spent ferrates may be regenerated.

The nickel carbonyl which results from the foregoing carbonylation techniques is typically mixed with carbon monoxide, small amounts of carbonate resulting from the nickel reduction, and certain quantities or iron pentacarbonyl. Methods of concentrating nickel carbonyl and separating it from iron carbonyl are well known in the art. See, for example, U.S. Pat. No. 3,688,474 to M. D. Head et al., entitled "Collection of Metal Carbonyls". After purification and concentration, the nickel carbonyl may readily be decomposed, e.g., thermally, to produce pure nickel metal and carbon monoxide.

The invention will be further understood from the following nonlimiting examples.

EXAMPLE 1

4.7 g of potassium hydroxide are dissolved in 4 ml of water and the resulting aqueous alkaline solution is added to 50 ml of the water insoluble alcohol 2-ethyl hexanol. 2.7 ml of iron pentacarbonyl are then added to the two-phase mixture under carbon monoxide. After stirring, both phases turn red. The two-phase mixture is then heated to 86° C. to load the organic phase with carbonyl ferrate ions and the lower aqueous phase is removed.

47 ml of the carbonyl ferrate containing organic phase is then added to a 25 ml sample of a 10 g/l ammoniacal nickel solution (as $NiSO_4$). The reactor is fitted with a series of nitric acid filled traps and a flow of carbon monoxide is maintained through the system. While maintaining a carbon monoxide flow rate of about 18 bubbles per minute, stirring is commenced and the gaseous products of reaction are collected in the traps. For 45 minutes, the temperature of the two-phase mixture is maintained between about 40° and 45° C. At the end of 45 minutes, the scrubbing solution in the first trap is green colored, indicating the presence of nickel. Thereafter, the temperature is increased from 45° to 80° C. About 1 hour later, the reaction is shut down.

The small amount of solids in the reactor, the organic and aqueous phases, and the scrubbing solution are assayed for nickel and iron. Of the total amount of nickel originally present in the ammoniacal solution, 81.8% reports in the scrubbing solution (transferred as $Ni(CO)_4$), 14% remains in the organic phase, 0.75% remains in the aqueous, and 3.5% is contained in the solid residue. Of the total iron originally introduced in the organic phase, 9.4% reports in the scrubbing solution, 53% remains in the organic phase, 32.7% remains in the aqueous phase, and 4.5% is present in the solid residue.

EXAMPLE 2

Under a carbon monoxide atmosphere, 25.0 ml of an 11.12 g/l ammoniacal nickel sulfate solution (total nickel 0.225 g) is mixed at 42° C. with 8.95 g. of $Na_2Fe(CO)_4$ reagent (total iron 1.1579 g) stabilized with dioxane and dissolved in 11 ml of $H_2O$. At a carbon monoxide flow rate of about 90 bubbles/min., the first of the traps in the series turns green in about 15 min. due to the presence of nickel carried over as $Ni(CO)_4$. If necessary, 2–5 ml of concentrated $NH_4OH$ may be added to make up for ammonia loss through the gas stream.

The carbon monoxide flow is continued for about one hour, after which the traps are isolated, and oxygen is bubbled through the reactor to precipitate the iron compounds and to produce an iron-free raffinate.

Of the total nickel originally present in the ammoniacal solution, 0.1882 g (74%) reports in the scrubbing solution, 0.029 g (11.37%) reports in the iron-free raffinate, and 0.0377 g (14.8%) reports in the solid precipitate. Of the total iron originally introduced as ferrate ion, 0.00036 g (0.031%) reports in the iron-free raffinate and 1.1575 (99.96%) reports in the solid precipitate.

EXAMPLE 3

Ferrate ions are generated by mixing 2.7 ml of $Fe(CO)_5$, 3.2 g $Ca(OH)_2$, 10 ml $H_2O$ 27 ml 2 ethyl-hexanol, and 10 ml of a long chain organic amine (Primene JM-T, Rohm & Haas) in a reflux condensor under a carbon monoxide atmosphere. The mixture is vigorously stirred and maintained at a temperature between 75°–90° C. for 1 hour. After sweeping most unreacted $Fe(CO)_5$ from the system with carbon monoxide, the brick-red phases are allowed to separate.

Twenty ml of the organic phase are then added to 20 ml of an ammoniacal nickel solution (11.03 g/l Ni) in a carbonylation reactor at 45° C. while passing carbon monoxide therethrough at a slow flow rate. After 1 to 1.5 hr., the temperature is increased to 79° C. and the off gas is diverted to a new trap series. Methanol (5.0 ml) is then added to the carbonylation reactor and stirring is continued for 1 hour (at 79° C.).

Analysis of the first trap series indicates that 0.0742 g Ni and 0.0375 g Fe were transferred via the gaseous phase. In the second trap series, 0.0750 g Ni and 0.0375 g Fe were present. The total nickel recovered amounts to 0.1492 g or about 67.8%.

Referring to the drawing, FIG. 1 shows an overall nickel recovery system employing the two-phase embodiment of the carbonylation technique of the invention. An ammoniacal nickel solution from leaching tank 10 is delivered to nickel carbonylation reactor 12 together with carbon monoxide and a water insoluble alcohol solution containing carbonyl ferrates. The carbon monoxide pressure need be only high enough to assure that a continuous flow of the gas passes through the two-phase mixture. To assure complete nickel carbonylation, the mole ratio of carbonyl ferrate in the organic solution to nickel ammine in the aqueous phase should be on the order of two. The temperature in the carbonylation reactor 12 is maintained between about 25° and 85° C. In carbonylation reactor 12, carbonate and bicarbonate are produced as carbon monoxide reduces nickel ions, and nickel carbonyl and excess carbon monoxide pass upwardly via line 14 to a carbonyl concentration stage 16. In stage 16, as is known in the art, nickel tetracarbonyl can be concentrated, e.g., condensed under pressure, and absorbed into a suitable solvent or separated from iron pentacarbonyl in the manner disclosed in U.S. Pat. No. 3,688,474 to M. D. Head et al. Once concentrated in stage 16, nickel carbonyl is thermally decomposed in reactor 18 to pure nickel metal which exits via stream 20 and carbon monoxide gas which may be recycled via stream 22.

The aqueous raffinate and spent organic exit via stream 24 to conventional liquid-liquid separator 26. Iron which will inevitably be present in the aqueous phase is then removed in iron precipitation reactor 28. While those skilled in the art will recognize that there are various methods of precipitating iron, air oxidation is preferred because of its low cost. After separation of the liquid and solid phases produced in iron precipitation reactor 28 the iron oxidation products are transported via line 30 to iron pentacarbonyl generator 32. In generator 32, the iron oxides or hydroxides are reduced by carbon monoxide to produce iron pentacarbonyl, the precursor of the active carbonyl ferrates. This will require pressures as high as 1000 psi and elevated temperatures.

The iron pentacarbonyls produced in generator 32 are then transported to a carbonyl ferrate production stage 34 together with aqueous base (KOH in the illustrated embodiment), carbon monoxide, and the spent ferrate containing organic phase from liquid-liquid separator 26. In stage 34, $HFe(CO)_4^-$ and $Fe(CO)_4^=$ are produced in accordance with the reaction set forth above. Thereafter, both phases are delivered via line 36 to carbonylation reactor 12 to treat further quantities of nickel ammine solution. If desired, prior to introducing the carbonyl ferrate ions into carbonylation reactor 12, the aqueous phase may be removed via a liquid-liquid separator (not shown).

The substantially iron and nickel free ammoniacal raffinate exiting via stream 38 from iron precipitation reactor 28 will contain carbonate and sulfate ions. Furthermore, unless the aqueous and organic phase are separated prior to introducing the carbonyl ferrates produced in reactor 34 to carbonylation reactor 12, the aqueous raffinate will also contain potassium ions in excess and added water. Accordingly, to assure mass balance, a purge system will be required if the aqueous ammoniacal raffinate is to be recycled to leach additional nickel values.

At this point it should be mentioned that the use of $Ca(OH)_2$ or $Ba(OH)_2$ in the alkaline solution needed to generate the active ferrates has certain advantages over other types of alkali. Specifically, the removal of certain anions such as sulfate and carbonate is simplified when $Ba^{++}$ or $Ca^{++}$ is present in the carbonylation reactor. Sulfate ions will frequently be present in the ammoniacal leach liquor, for example, as a result of an oxidative leach of NiS bearing ores. Carbonate ions may be present as a consequence of reduction leaching of manganese nodules or the like, and in any case are generated in the alkaline environment during carbonylation. Thus, during carbonylation, barium or calcium carbonate and/or sulfate precipitates in carbonylation reactor 12 and is carried along with the aqueous phase until removed by the purge system.

Figure 2:
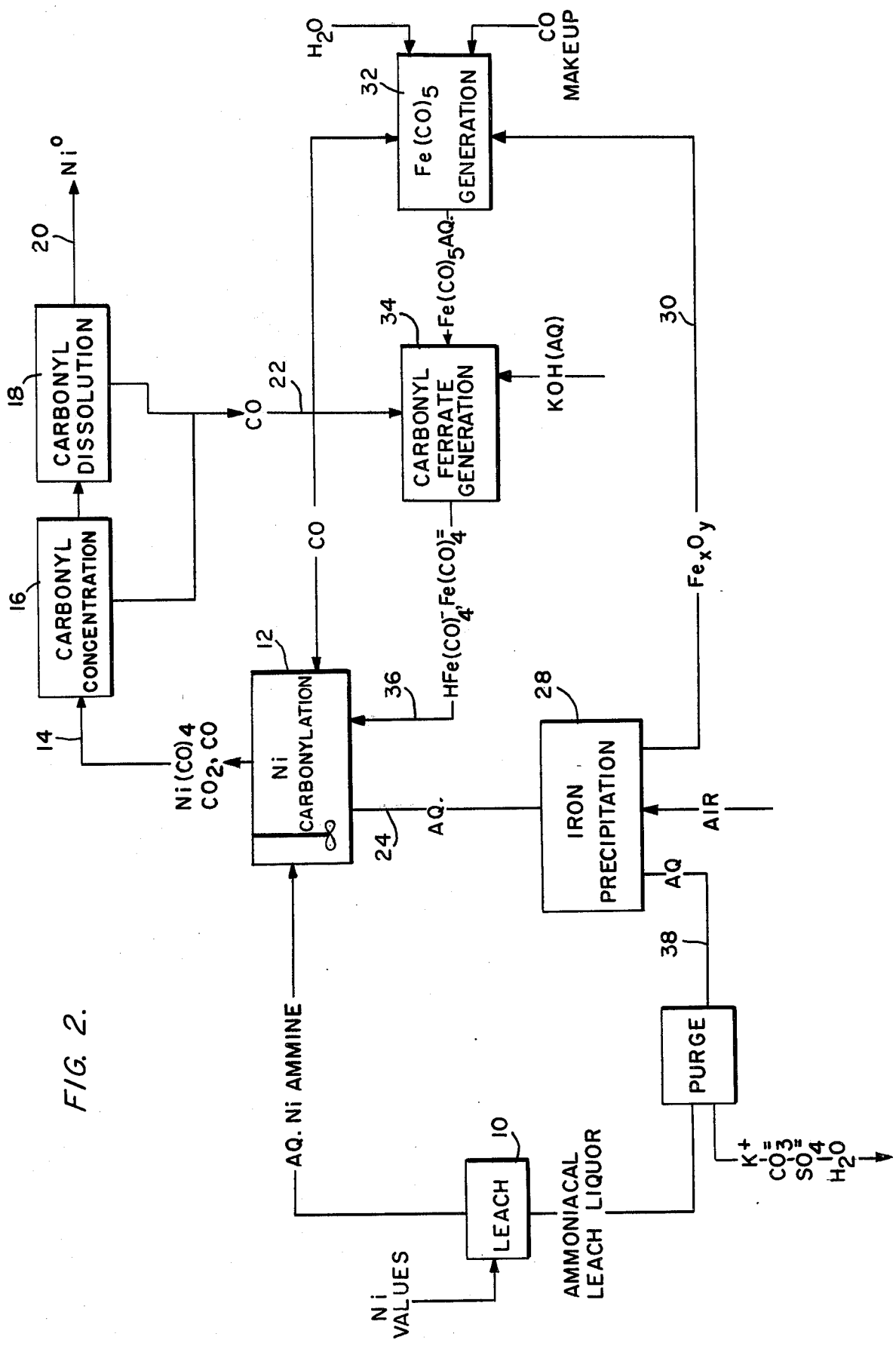
FIG. 2 is a schematic diagram illustrating a second nickel recovery process of the invention wherein the nickel carbonylation reaction is effected in single phase aqueous solution.

Referring to FIG. 2, a second nickel recovery system embodying the single phase carbonylation technique of the invention is shown. The system of FIG. 2 differs from the embodiment of FIG. 1 in that the water soluble alcohol employed as a carrier is omitted. Thus, in the carbonylation reactor 12, an aqueous carbonyl ferrate solution is mixed with the aqueous nickel ammine solution to produce nickel carbonyl. Of course, in the absence of the organic phase, the liquid-liquid separator 26 in the embodiment of FIG. 1 is omitted. Similar to the system of FIG. 1, iron pentacarbonyl produced in carbonyl generator 32 is delivered to a carbonyl ferrate production stage 34 which, in this embodiment, receives only an aqueous alkaline solution and carbon monoxide. Thereafter, the carbonyl ferrates are introduced into carbonylation reactor 12 via line 36 for reuse. In all other material respects, the system of FIG. 2 is identical to that of FIG. 1.

The invention will be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for recovering nickel from an ammoniacal nickel solution comprising the steps of:
   contacting the nickel solution with carbonyl ferrate ions in a carbon monoxide rich environment to produce a nickel carbonyl;
   collecting the nickel carbonyl by separating a gas phase from said solution; and
   decomposing the nickel carbonyl to produce nickel metal and carbon monoxide.

2. The process as set forth in claim 1 wherein said carbonyl ferrate ions are carried in a water immiscible organic solvent.

3. The process as set forth in claim 2 wherein the organic solvent is a water immiscible alcohol.

4. The process as set forth in claim 1 wherein the carbonyl ferrate ions are provided by contacting a member selected from the group consisting of calcium, potassium, barium, and sodium salts of $HFe(CO)_4^-$ and $Fe(CO)_4^=$ with said nickel solution.

5. The process as set forth in claim 1 wherein the carbonyl ferrate ions are provided by reacting iron pentacarbonyl with a base selected from the group consisting of KOH, NaOH, $Ca(OH)_2$, $Ba(OH)_2$, and mixtures thereof.

6. The process as set forth in claim 1 wherein said contacting step is conducted at a temperature no greater than 100° C. and a pressure no greater than 3 atmospheres.

7. A process for recovering nickel from an aqueous ammoniacal nickel solution by producing nickel carbonyl comprising the steps of:
   A. contacting said nickel solution with carbon monoxide and an organic phase containing carbonyl ferrate ions to produce $Ni(CO)_4$;
   B. collecting the $Ni(CO)_4$ as a gas and decomposing the gas to produce nickel metal;
   C. separating the aqueous substantially nickel-free solution from the organic phase containing spent ferrate ions;
   D. converting spent ferrate ions contained in the organic phase by treatment with carbon monoxide and an aqueous alkaline solution to carbonyl ferrate ions capable of carbonylating nickel ammine; and
   E. contacting the regenerated carbonyl ferrate containing organic solution resulting from step D with an aqueous ammoniacal nickel solution to produce nickel carbonyl.

8. The process as set forth in claim 7 wherein step D is effected employing $Fe(CO)_5$ as an intermediate.

9. The process as set forth in claim 7 wherein the aqueous substantially nickel free solution separated in step C contains iron, said process comprising the additional steps of:
   F. precipitating the iron from the nickel-free aqueous solution; and G. recycling the substantially iron-free solution resulting from step F to solubilize additional nickel values.

10. A process for recovering nickel from an aqueous ammoniacal nickel solution by producing nickel carbonyl comprising the steps of:
   A. contacting said nickel solution with carbon monoxide and a carbonyl ferrate ion containing aqueous solution to produce $Ni(CO)_4$;
   B. collecting the $Ni(CO)_4$ as a gas and decomposing the gas to produce nickel metal;
   C. converting spent carbonyl ferrate ions contained in the solution resulting from step A by treatment with carbon monoxide and an aqueous alkaline solution to carbonyl ferrates capable of carbonylating nickel ammine, and
   D. contacting the regenerated carbonyl ferrate ions resulting from step C with an aqueous ammoniacal nickel solution to produce nickel carbonyl.

11. The process as set forth in claim 10 wherein step C is effected by employing $Fe(CO)_5$ as an intermediate.

12. The process as set forth in claim 10 wherein the substantially nickel free solution resulting from step A contains iron, said process comprising the additional steps of:
   E. precipitating the iron from the nickel-free aqueous solution; and
   F. recycling the substantially iron-free solution resulting from step E to solubilize additional nickel values.

* * * * *